Patented Apr. 13, 1943

2,316,241

UNITED STATES PATENT OFFICE 2,316,241

PREPARATION OF BEER

Eberhard Heimann, Berlin-Schoneberg, Germany; vested in the Alien Property Custodian No Drawing. Application September 25, 1939, Serial No. 296,497. In Germany November 5, 1938

6 Claims. (Cl. 99—48)

The present invention relates to improvements in the preparation of beer.

It is an object of the invention to provide an improved process for the preparation of beer which is substantially free from the albuminous substances which render beer unstable and cause clouding of the beer upon being subjected to temperature fluctuations, shaking or long storage.

Another object of the invention is to provide a process which improves the taste and color of beer.

In the specification and claims, the term "beer" is used in a comprehensive sense to include ales and other beverages commonly falling under the classification of beer.

It has already been proposed to employ numerous adsorption agents, as well as enzymatic agents, in the preparation of beer in order to improve its keeping qualities, taste and color. It, furthermore, has already been proposed to employ silica gel as an adsorption agent in the preparation of beer. In the known processes employing silica gel, it was found necessary to maintain the silica gel in contact with the beer treated for a period of four to eight days while keeping the beer in constant motion. Without this constant motion of the beer during the contact period, and, especially, when a shorter period of contact is employed, it is not possible to prevent deleterious changes, especially clouding, in the beer with the aid of silica gel.

It has now been found that, if a specially prepared silica gel is employed as an adsorption agent instead of the commercial gel which was previously employed, it is possible to remove the substances from beer which cause it to cloud merely by contacting beer, or the fluids employed in the preparation of beer, such as, worts, for a short period of time as, for example, by filtering such liquids therethrough or by adding a small quantity of the material to the liquids and stirring the mixture for a short period.

The silica gel which is to be employed in accordance with the present invention is silica gel which has been subjected to an alkalizing treatment. Silica gel prepared in this manner removes the substances from beer or the liquids employed in the preparation of beer which cause clouding in beer in a short period of time to produce a beer which is completely stable during pasteurization, chillproof and stable when subjected to shaking such as would occur during transportation. This, however, cannot be attained when employing an ordinary silica gel prepared with an acid.

The specially prepared silica gel employed in accordance with the present invention is hereinafter designated as "alkalized silica gel."

The following procedure may, for example, be employed to produce the alkalized silica gel to be employed in the preparation of beer in accordance with the present invention.

A silicic acid sol is produced by mixing waterglass and an acid and is then treated with ammonia to precipitate the hydrogel. The colloid which is thus obtained is then freed of any excess liquid by pressing and is then carefully washed, dried and granulated. Storage of the colloid before washing is preferably avoided. In some instances, it is preferable to subject the hydrogel which is precipitated from the silicic acid sol to a supplemental washing treatment with dilute solutions of alkalies or alkaline salts.

The following procedure for the preparation of the alkalized silica gel has been found especially advantageous:

A silicic acid sol, produced by the treatment of a dilute waterglass solution with a dilute acid, is either allowed to stand or is heated or cooled to precipitate the hydrogel. It is necessary to allow the sol to stand at rest for several days if precipitation of the hydrogel is effected merely by allowing the sol to stand. If the precipitation of the hydrogel is to be effected by heating, it is only necessary to heat the sol for a short time at temperatures between 90° C. and 100° C. and to subject it to a digesting treatment. The hydrogel which has been obtained by one of the above treatments is then filtered off with suction and is washed with a dilute alkaline solution, preferably dilute ammonia or lime water. Thereafter the alkalized silica gel is pressed, dried and granulated. It is also possible to subdivide the precipitated gel before the washing treatment.

It is important in the preparation of the alkalized silica gel that the silica gel is treated with alkaline liquids before the silica gel has had the opportunity to shrink upon drying in order that the desired structure of the alkalized silica gel is obtained. In this manner the alkalized silica gel obtained has a structure which renders it possible for such gel to take up the deleterious substances contained in beer which normally cause clouding of the beer.

Only relatively small amounts of the alkalized silica gel are necessary for the treatment of beer or the liquids employed in the preparation of beer. For example, a few tenths of one per cent of the alkalized gel, when mixed with beer or wort, will produce the desired improvement. The time of contact may be less than a half an hour. Simple mixing of the alkalized gel with the beer or wort, or merely filtering such liquids through such gel, is sufficient. Shaking or stirring are not necessary.

Preferably the deleterious substances in beer are removed by treating the beer with the alkalized silica gel subsequent to the fermentation. However, the beer may be improved by treating the liquids employed in their preparation, for example, the wort with the alkalized silica gel, or it is possible to treat the liquids employed in the preparation of beer as well as the beer subsequent to the fermentation. It has also been found to be of special advantage if beer wort is treated with the alkalized silica gel prior to hopping as this prevents losses in the hops normally caused by the occlusion in the precipitates caused by the coagulable albumens in the wort during the hopping of the wort. When employing an alkalized silica gel treatment in the preparation of beer, it is possible to reduce the period of ripening and making the beer.

The beer treated in accordance with the present invention is stable during storage. It may furthermore be subjected to alternate heating and cooling together with shaking without becoming cloudy. It has been found that even after constant shaking of the treated beer for as long as a month the beer remained absolutely clear.

The alkalized silica gel prepared in accordance with the present invention, however, does not remove the substances from the beer which are essential for the taste of the beer and for the nutrient value of the beer.

The following examples serve to illustrate the present invention, but the invention is not limited thereto:

*Example I*

Into a mixture of 100 litres concentrated hydrochloric acid with 100 litres of water was introduced a mixture of 280 litres of commercial waterglass solution of 40° Bé. with 280 litres of water while cooling and agitating the resulting mixture in order that a clear silicic acid sol was obtained. This sol was then caused to gel by subjecting it to a short heating treatment. The silica gel which was thus obtained was subdivided into particles of the desired size and was then washed with dilute hydrochloric acid and then with water. The water available for the washing contained lime salts in the form of carbonates, and was in itself sufficient for the alkalizing treatment of the acid silica gel. The washing treatment was continued until the effluent washing water had the same alkalinity as that introduced.

The washing process may be expedited by the introduction of small quantities of ammonia or calcium chloride into the washing water and in this case the washing must also be continued until the effluent water has the same alkalinity as that introduced.

A small amount of the alkalized silica gel thus obtained was mixed with beer subsequent to the fermentation and was allowed to remain in contact with the beer for about a half an hour, and was then separated therefrom. The resulting beer was of good flavor and color. It, furthermore, withstood long storage, temperature fluctuations and shaking without becoming cloudy.

*Example II*

A silicic acid sol was prepared in the manner described in Example I. The sol was then precipitated with ammonia and washed with a dilute ammonia solution without first subdividing the gel. Thereafter the alkalized gel was dried at temperatures up to 300° C. and the dried product granulated.

This dried product was then employed for filtering beer, and it was found that 100 to 500 litres of beer can be filtered through a litre of such gel before such gel was spent. The beer had the same qualities as that obtained in accordance with Example I.

The spent alkalized silica gel was regenerated by boiling it in a strong ammonia solution, filtering it off from the ammoniacal fluid and the impurities and then washing it with dilute ammonia. This regenerated alkalized silica gel possessed the same qualities as the originally prepared gel, and thus it was possible to re-employ the alkalized silica gel several times when subjected to further regeneration treatments.

While I have described herein some of the embodiments of my invention, I do not intend to limit myself thereby except within the scope of the appended claims.

I claim:

1. In a process for the preparation of beer, the step which comprises bringing an alkalized silica gel in contact with the beer during its preparation.

2. In a process for the preparation of beer, the step which comprises bringing an alkalized silica gel in contact with the beer subsequent to its fermentation.

3. In a process for the preparation of beer, the step which comprises bringing an alkalized silica gel in contact with the wort employed in the preparation of beer.

4. In a process for the preparation of beer, the step which comprises bringing an alkalized silica gel in contact with the wort employed in the preparation of beer prior to hopping of the wort.

5. A process for improving beer which comprises filtering beer subsequent to its fermentation through an alkalized silica gel.

6. A process for improving beer which comprises filtering beer subsequent to its fermentation through a granular alkalized silica gel.

EBERHARD HEIMANN.